UNITED STATES PATENT OFFICE.

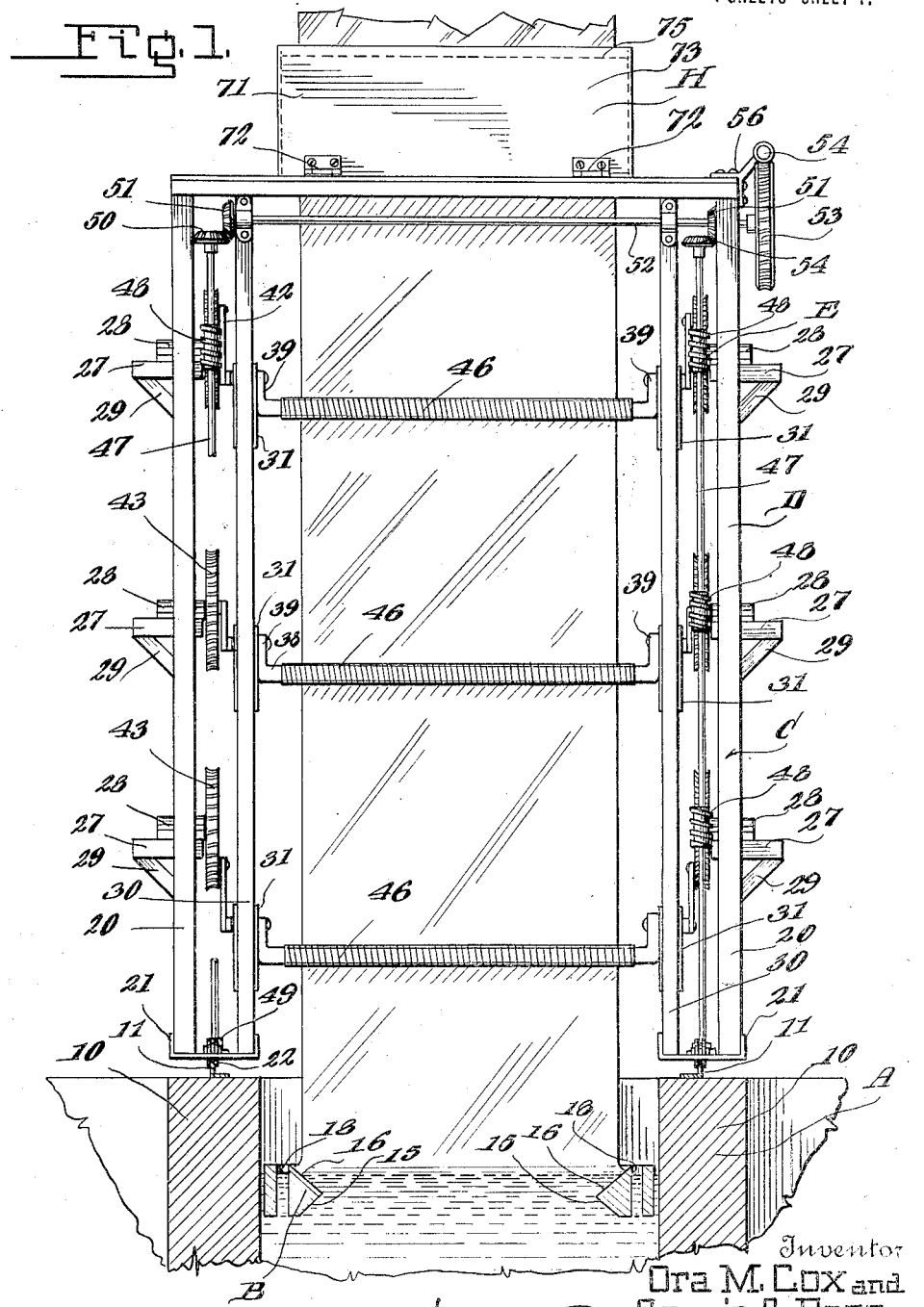

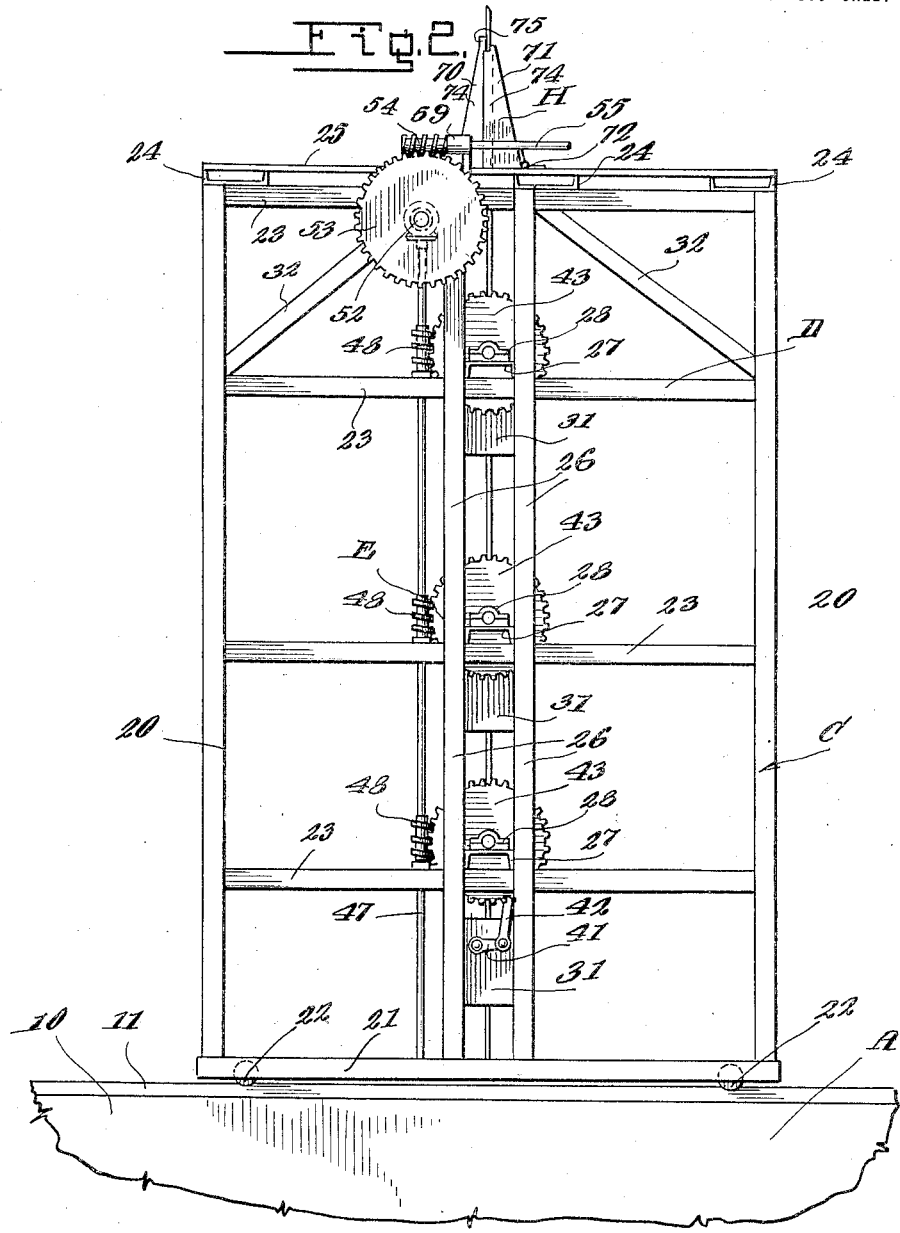

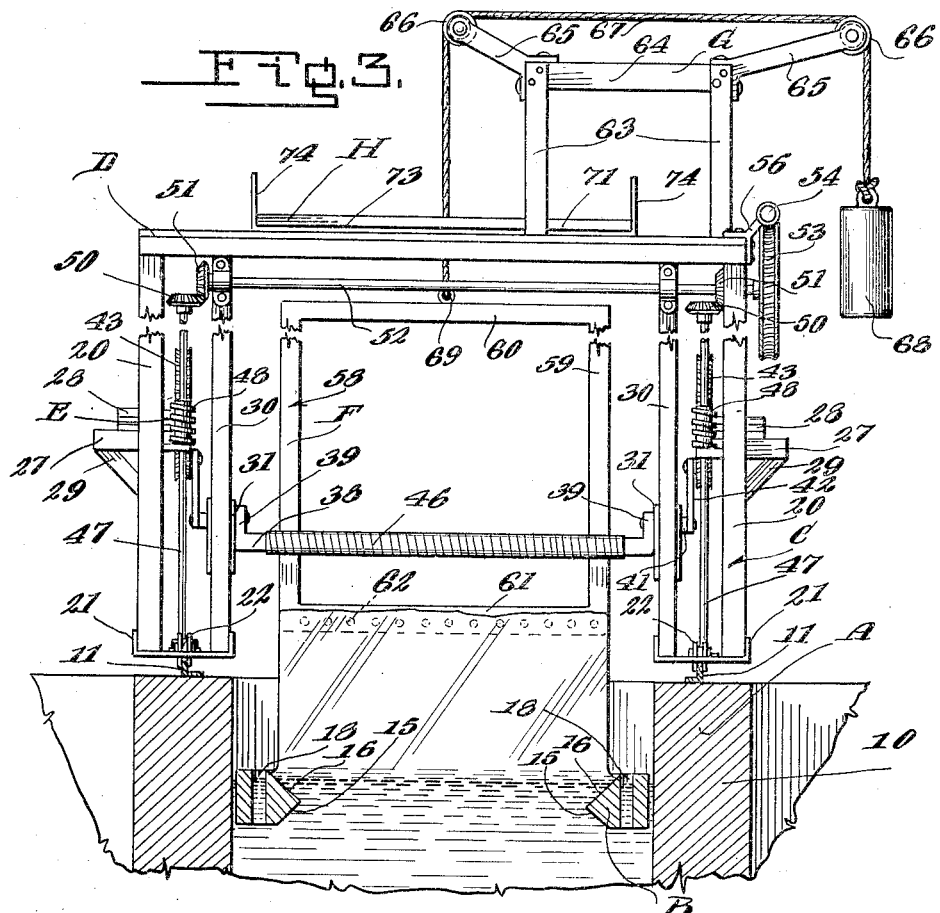
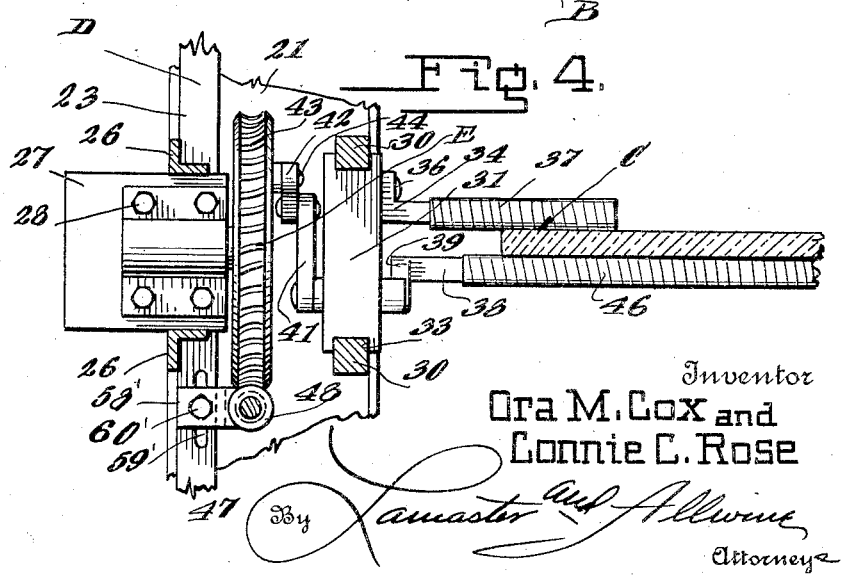

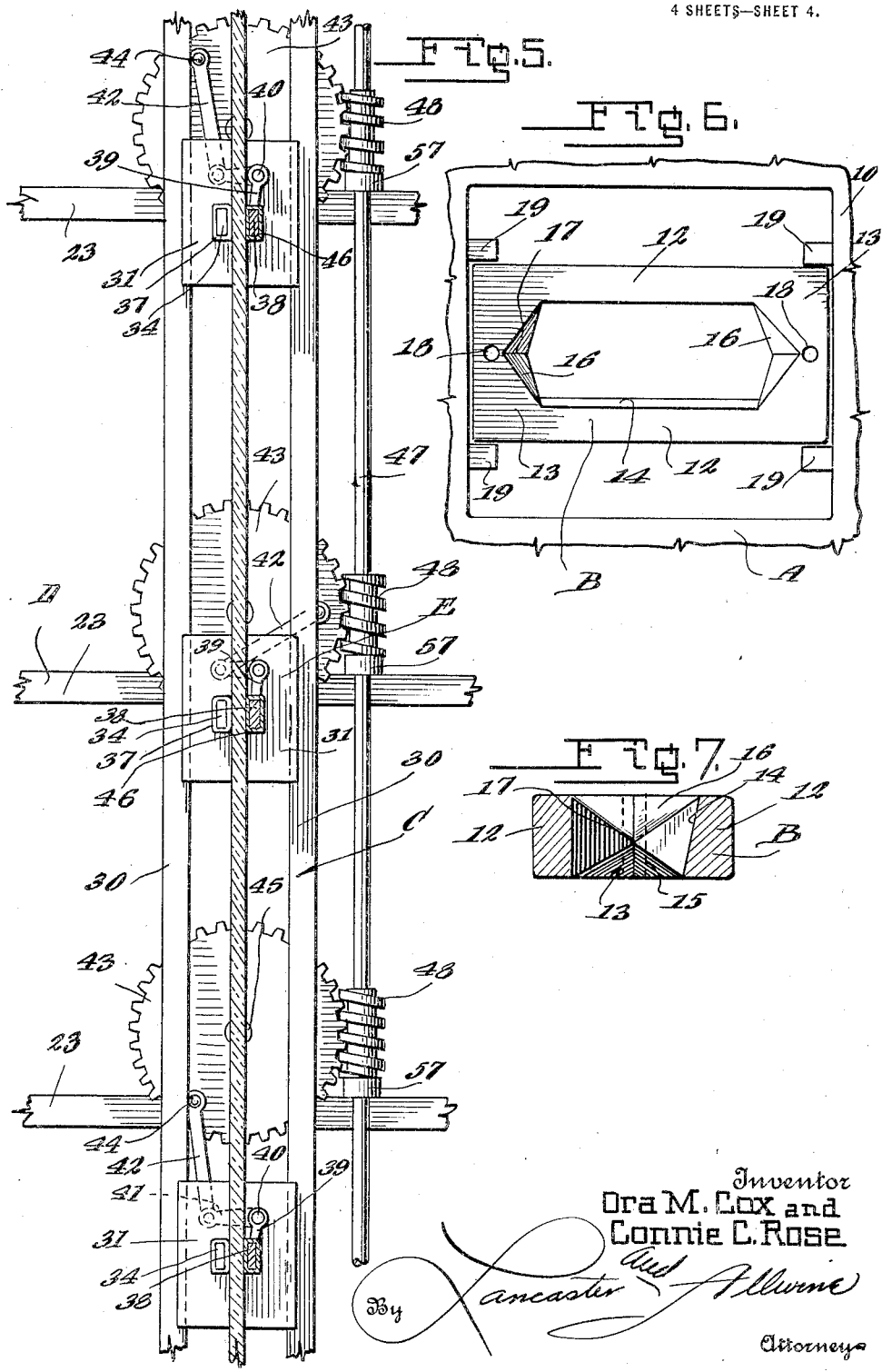

ORA M. COX, OF MANAYKA, AND CONNIE C. ROSE, OF CLARKSBURG, WEST VIRGINIA.

SHEET-GLASS-DRAWING MACHINE.

1,423,195. Specification of Letters Patent. Patented July 18, 1922.

Application filed February 25, 1920. Serial No. 361,129.

*To all whom it may concern:*

Be it known that we, ORA M. COX and CONNIE C. ROSE, citizens of the United States, residing at Manayka, Harrison County, West Virginia, and Clarksburg, Harrison County, West Virginia, have invented certain new and useful Improvements in Sheet-Glass-Drawing Machines, of which the following is a specification.

This invention relates to sheet glass drawing machines, and the primary object of the invention is to provide an improved machine for continuously drawing sheet glass, and thereby eliminate the necessity of intermittently raising and lowering the bait for drawing the glass from the molten glass container or pot.

A further object of the invention is to provide a glass drawing machine movable over a glass container embodying an improved means for continuously drawing a sheet of glass from the container and having means arranged at the top of the machine for cutting the glass into suitable lengths as the same is being drawn.

A further object of the invention is to provide an improved means embodying a plurality of spaced clamps for intermittently gripping and releasing the glass sheet at different periods for continuously drawing the same from the molten glass container.

A further object of the invention is to provide an improved means for operating the clamps for raising and lowering the same and for moving the clamp into intimate gripping contact with the glass sheet during the raising thereof and for releasing the clamps from the sheet during the lowering thereof.

A further object of the invention is to provide an improved type of bait for starting the drawing of the sheet from the molten glass container, the bait being of such a configuration as to be engaged by the glass sheet drawing clamps, so that the bait will be drawn up through the machine similar to the sheet glass, and which is adapted to be detached from the sheet glass when the same reaches the top of the machine.

A further object of the invention is to provide an improved type of formation anchor or float, which is especially designed for cooling the sheet glass at the edges thereof for strengthening or toughening the same so as to draw a sheet of uniform width.

A further object of the invention is to provide an improved anchor, which is so shaped as to cause the flow of glass to narrow and widen as the same is being drawn from the molten tank, so as to break up the molecules in the glass and thus toughen the same, the anchor being also formed so as to equalize the temperature of the anchor on each side of the sheet being drawn.

A still further object of the invention is to provide an improved glass sheet drawing machine of the above character which is durable and efficient in use, one that is simple and easy to manufacture, and one that can be placed upon the market at a reasonable cost.

Other objects and advantages of the invention will appear in the following detailed description taken in connection with the drawings forming a part of this specification, in which drawings:

Figure 1 is an end elevation of the improved machine, showing the glass container and formation anchor in section.

Figure 2 is a side elevation of the improved machine.

Figure 3 is an end elevation of the improved machine showing the bait being drawn from the molten glass container having a sheet of glass attached thereto, the machine having the suppplemental frame attached thereto for supporting the bait, the molten glass container and formation anchor being shown in section.

Figure 4 is an enlarged detail fragmentary horizontal section through the machine illustrating one of the clamps for engaging the glass sheet.

Figure 5 is an enlarged fragmentary central vertical section through the improved machine.

Figure 6 is a fragmentary detail plan view of the molten glass container showing the formation anchor therein, and Figure 7 is a detail transverse section through the formation anchor.

Referring to the drawings, in detail, wherein similar reference characters designate corresponding parts throughout the several views, the letter A indicates the molten glass container; B the formation anchor in the container, and C, the improved machine. The machine C includes the frame D, the sheet glass drawing clamps and operating means E, therefor, the bait F, the support or supplemental frame G therefor, and H the cutting bench or stand.

The molten glass container A may be of any size or configuration and connected to or formed with a furnace in the ordinary manner. The container A as shown includes side walls 10, which have secured to their upper faces, longitudinally extending tracks 11, formed of angle iron or the like. These tracks 11 are adapted to receive the machine C which will be hereinafter more fully described. The formation anchor B is arranged in the container A and floats on the upper surface of the molten glass in the container in the ordinary manner. The anchor B is formed so that the glass sheet being drawn from the container will be strengthened at its edges so that a sheet may be drawn of uniform width.

The anchor B is preferably made of refractory material and includes a substantially rectangular frame having the side walls 12 and end walls 13. The side wall 12 which is arranged adjacent to the supply tank, (not shown) is formed relatively thicker than the opposite wall, and is provided with a downwardly and inwardly inclined inner face 14, the inclined face 14 acting as a shelf or ledge tending to equalize the temperature on each side of the glass sheet being drawn. The inner faces of the end walls 13 have their lower surfaces inclined upwardly and inwardly as at 15 and their upper portions inclined downwardly and inwardly as at 16. These faces 15 and 16 are bevelled inwardly from the longitudinal center of the formation anchor B as at 17, and this forms a substantially funnel shaped entrance and exit which causes the flow of glass to narrow and widen as the same is drawn from the container so as to break up the molecules in the glass which causes the glass to toughen at its edges. Arranged on opposite sides of the inclined faces 15 and 16 at the longitudinal center of the formation anchor B are vertically extending openings 18 which render the anchor relatively thin at the point of formation of the glass sheet, and this point is exposed to the atmosphere which cools the edges of the glass and tends to cause a sheet of uniform width to be drawn. The inner faces of the side walls 10 of the molten glass container A are provided with inwardly extending spaced guides 19 which engage the outer surfaces of the side walls of the formation anchor B and prevent relative lateral movement of the same in the container.

The frame D of the improved glass drawing machine C includes the upwardly extending corner standards 20 which are formed of angle iron or the like. The lower ends of the corner standards 20 are secured to the outer terminals of the longitudinally extending lower U-shaped channel beams 21, which rotatably carry the flanged wheels 22 for engaging the tracks 11. The posts 20 intermediate their ends are connected by longitudinally extending bars 23, and the uppermost bars are connected by the transversely extending U-shaped channel beams 24 which support the operator's platform 25. Arranged intermediate the corner standards 20 are the vertically disposed spaced angle bars 26, which have disposed between the same the outwardly extending supporting blocks 27, for the bearings 28, which will be hereinafter more fully described. The supporting blocks 27 may be braced if so desired by suitable diagonally disposed bars 29 as clearly shown in Figure 3 of the drawings. Arranged inwardly of the intermediate angle bars 26 and in direct alignment therewith are the vertically extending bars 30 which have their lower terminals secured to the lower U-shaped channel beams 21 and their upper ends to the transverse channel beams 24. These vertically disposed bars 30 form guides or tracks for the slide blocks 31 of the clamping mechanism E for raising the sheet glass. The uppermost bars 23 have secured thereto the outwardly extending diagonally disposed brace bars 32, which extend to the corner standards 20. These bars 32 form means for bracing the upper ends of the frame so as to prevent relative movement between the corner standards 20.

The sheet glass drawing clamps and operating means E include the slide blocks 31 which are arranged in spaced relation to one another and in direct vertical alignment. The side edges of the blocks 31 are provided with grooves 33 for receiving the bars 30 so as to prevent relative lateral movement of the blocks 31 in relation to the bars 30. The blocks 31 are arranged in pairs and the inner faces of each pair of blocks carry inwardly extending rigid clamping arms 34, which are secured to the block by suitable fastening elements 36. These rigid clamping arms 34 have wound thereon asbestos rope or the like 37. Arranged in parallel relation to the rigid clamping arms 34 and in horizontal alignment therewith is a clamping arm or jaw 38, which extends entirely across the machine and has its terminals rigidly secured to the lower ends of crank arms 39, which are secured to shafts 40 rotatably carried by the block 31. The opposite ends of the shaft 40 have secured thereto the crank arms 41 which are arranged at an angle to the crank arms 39. The outer ends of the crank arms 41 have pivotally connected thereto the connecting rod or pitman 42, which is eccentrically connected to the operating worm wheels 43 as at 44. The worm wheels 43 are keyed to the shafts 45, which are rotatably mounted in the bearings 28 carried by the blocks 27. The clamping jaw or arm 38 has also secured thereto asbestos rope or the like 46, which is adapted to frictionally engage the surface of the glass sheet being drawn. Arranged on one side of the worm wheels 43 and at the opposite side of the machine are the vertically disposed operating shafts 47 which have secured thereto the worms 48 which are adapted to mesh with worm wheels 43, for turning the same to operate the guide blocks 31 and the movable clamping arms or jaws 38. The lower ends of the vertically disposed operating shafts 47 are mounted in suitable bearings 49 carried by the lower longitudinally extending U-shaped channel beams 21. The upper terminals of the shafts 47 carry bevelled gears 50 which mesh with bevelled gears 51 carried by the cross shaft 52, which is arranged transversely of the frame D at the upper end thereof. One end of the shaft 52 carries the relatively large worm wheel 53, which has meshing therewith the worm 54, which is keyed or otherwise secured to the operating shaft 55, which is driven from any suitable power source. The shaft 55 is rotatably supported by suitable bearings 56 secured to the frame of the machine at the upper end thereof. The vertical operating shafts 47 are rotatably mounted intermediate their ends in suitable bearings 57, which are provided with attaching feet 58' which are slidably mounted on the upper surface of the longitudinally extending intermediate beams 23. These intermediate beams are provided with slots 59', which receive the bolts 60' carried by the attaching feet 58'. By loosening or tightening the attaching bolt 60' the bearings 57 may be held against movement on the bars 23 or moved over the surface thereof for adjusting the worms 48 toward or away from the worm wheels 43. The blocks 31 are as stated, arranged one above the other and are so connected to the worm wheels 43 through the medium of the connecting rods 42 and the cranks 41 that when one of the blocks is being pushed down, another one of the blocks will be raised and the movable jaw carried by the block 31 being pushed down will be moved out of frictional contact with the glass sheet while the movable jaw carried by the block that is being pulled up will be forced into intimate gripping contact with the glass sheet for pulling the same upwardly. This arrangement is clearly shown in Figure 5 of the drawings.

The bait F which is used for starting the glass sheet up from the container 10 includes the substantially rectangular open frame 58 which includes the side wall 59 and the end walls 60 and 61. The lower bar 61 is provided with a plurality of spaced openings 62, through which the glass to be drawn is adapted to flow, so that the same may firmly adhere to the bait.

A supplemental frame G is connected to the frame D, when the bait F is being used, and this frame may be of any desired form or configuration and is clearly shown in Figure 3 of the drawings. As shown the frame D includes the supporting posts 63 and the transverse connecting bars 64, and the posts 63 and the transverse bars 64 carry the outwardly extending arms 65, which rotatably carry the pulley sheaves 66 around which is trained the cable 67, which carries the counterbalanced weight 68. The inner end of the cable is connected as at 69 to the upper bar 60 of the bait. The counterbalance 68 is provided for the bait F so that the clamps 46 will not have to lift the weight thereof. Arranged on the operator's platform 25 is the cutting bench or stand H which includes a pair of independent sections 70 and 71, which are arranged on the opposite sides of the sheet of glass being drawn, and these sections have their lower ends hingedly connected as at 72 to the platform so as to permit the same to be swung on the platform away from the sheet of glass being drawn. The sections 70 and 71 each include the inclined side wall 73 and the triangular shaped end walls 74 which are adapted to overlap when the sections 70 and 71 are in their raised position. The section 70 carries an upstanding flange 75, which projects beyond the upper end of the section 71 and forms means for forming a rest for the sheet of glass when the same is being cut.

In cutting the glass it is not necessary to stop the operation of the machine as the glass moves slowly through the machine, and the operator draws the cutting tool very rapidly across the glass and breaks the same off at the point cut.

In operation of the improved machine, the supplemental frame G is placed in position on the operator's platform 25 of the main frame D of the machine and the bait F is lowered into the container B between the clamps E. When the molten glass has flowed through the openings 62 formed in the bar the machine is set in operation and the blocks 31 will be alternately raised or lowered, and the movable jaw 36 moved into frictional intimate contact with the plate on the upstroke of the block and out of frictional contact with the plate on the downstroke of the block. As the blocks are alternately raised and lowered, the bait will be gradually drawn up through the machine drawing a sheet of glass therewith. The cutting bench H is moved to inoperative position as clearly shown in Figures 2 and 3 of the drawings, and when the plate reaches the upper end of the machine the same is broken off of the sheet of glass and then removed from the machine. The operation is then continuous and the sections 70 and 71 of the cutting bench or stand are placed in operative position as clearly shown in Figure 2 of the drawings, and as the sheet of glass issues from the cutting bench or stand, the same may be cut off by the operator into the desired lengths.

From the foregoing description it can be seen that an improved glass drawing machine has been provided, which is exceptionally simple in operation and which will entirely eliminate the necessity of employing skilled workmen for drawing the glass.

Changes in details may be made without departing from the spirit or scope of our invention; but,

We claim:

1. A machine for the manufacture of sheet glass comprising an overhead frame mounted in working relation with a container for molten glass, reciprocatory means carried by the frame arranged to pull the sheet glass from the container, and means for receiving sheet glass from said reciprocatory means.

2. A machine for the manufacture of sheet glass comprising a frame mounted in working relation with a container for molten glass, a plurality of reciprocatory members carried by the frame, and means carried by said reciprocatory members for alternately gripping and releasing the sheet glass being drawn from the container in proper sequence.

3. A machine for the manufacture of sheet glass comprising a frame adapted to be mounted in working relation with a container for glass, a plurality of reciprocatory blocks carried by the frame, and means carried by the blocks working in proper sequence for alternately gripping and releasing the sheet glass drawn from the container.

4. The combination with a molten glass container, of a machine for drawing the glass from the container including a frame movably mounted over the container, and means carried by the frame working in proper sequence for alternately lifting and releasing the sheet glass being drawn from the container.

5. The combination with a molten glass container, of a machine for drawing sheet glass from the container including a frame movably mounted on the container, a plurality of reciprocating blocks carried by the frame, means for operating the blocks, and clamps carried by the blocks for alternately gripping and releasing the sheet glass being drawn from the container.

6. The combination with a molten glass container having a formation anchor therein, of a machine for drawing sheet glass from the formation anchor including a frame adjustably mounted on the container, a plurality of blocks slidably carried by the frame, clamps carried by the blocks, and means for reciprocating the blocks and for operating the clamps to alternately grip and release the sheet glass being drawn from the formation anchor.

7. The combination with a molten glass container having a formation anchor therein, of a machine for drawing sheet glass from the formation anchor including a frame, a plurality of sliding blocks carried by the frame, means for alternately raising and lowering the blocks, and means carried by the blocks for gripping the sheet glass upon the raising of the block and for releasing the glass upon the lowering of the block.

8. In a machine for drawing sheet glass from a molten glass container, a frame, spaced guides carried by the opposite sides of the frame, superposed pairs of spaced blocks slidably mounted in the guides, wheels carried by the frame, means for operating the wheels, crank arms eccentrically connected to the wheels and to the blocks, the blocks being adapted to be alternately raised and lowered in relation to each other, and clamps operatively connected to the connecting rod for gripping the sheet glass upon the upward movement of the block and for releasing the glass upon the downward movement of the block.

9. In a sheet glass drawing machine, a frame having a pair of spaced guides arranged on the opposite sides of the frame, pairs of superposed blocks slidably mounted in the guides, rigid clamping arms carried by the blocks, a movable clamping arm carried by the blocks, wheels rotatably carried by the frame, means for operating the wheels, connecting rods eccentrically connected to the wheels and operatively connected to the blocks, and means for operatively connecting the connecting rods with the movable clamping arms.

10. In a sheet glass drawing machine, a frame, a pair of spaced guides located at the opposite sides of the frame, superposed blocks slidably mounted in the guides, worm wheels rotatably carried by the frame, rotatable vertical shafts arranged in the opposite sides of the frame, worms keyed to the shaft and meshing with the wheels, means for connecting the shafts together for synchronous movement, connecting rods operatively connected to the worm wheels and to the sliding blocks, inwardly extending rigid arms carried by the sliding blocks, movable arms carried by the sliding blocks, crank arms pivotally carried by the sliding block, and connected to the movable clamping arm, and means operatively connecting the crank arms to the connecting rod.

11. A machine for drawing sheet glass from a molten glass container comprising a frame, an operator's platform carried by the upper end of the frame, means carried by the frame for continuously drawing sheet glass from the molten glass container, and a cutting bench carried by the upper end of the frame and having a pair of sections hingedly connected to the frame.

12. In a machine for drawing sheet glass from a molten glass container, a cutting bench including a pair of independent sections, and an upwardly extending bearing flange carried by one of the sections.

13. The combination with a sheet glass drawing machine including a frame, and a plurality of reciprocating clamps arranged to alternately grip and release the sheet glass drawn from the container, of a relatively thin flat bait for starting the sheet glass from the container arranged to be engaged by said gripping clamps.

14. The combination with a sheet glass drawing machine including a frame, a plurality of superposed reciprocating clamps carried by the frame and arranged to alternately grip and release the sheet glass being drawn, of a supplemental frame associated with the frame and including the outwardly extending arms, pulley sheaves carried by the arms, a rectangular shaped flat bait arranged to start the sheet glass from a molten glass container, and a cable connected to the bait and trained around the sheave wheels, and a counterbalancing weight connected to the outer end of the cable.

15. In a machine for drawing molten glass from a container, a bait comprising a substantially rectangular open frame having a horizontal line of perforations therein.

16. In a machine for drawing glass from molten glass container, a bait including a substantially rectangular open frame having side bars, and end bars, one of the end bars having a horizontal line of perforations therein.

17. In a sheet glass drawing machine, a formation anchor including side walls and end walls, the upper and lower surfaces of the inner faces of the end walls being inclined in opposite directions, the end walls having vertically extending openings formed therein.

18. In a sheet glass drawing machine, a substantially rectangular formation anchor including side walls and end walls, the end walls having the upper and lower faces thereof inclined inwardly in opposite directions, the said inclined faces being bevelled inwardly toward the central longitudinal axis of the block, the end walls having vertical openings extending therethrough in direct alignment with the longitudinal axis of the anchor.

ORA M. COX.
CONNIE C. ROSE.